United States Patent [19]
Allen et al.

[11] Patent Number: 5,988,341
[45] Date of Patent: Nov. 23, 1999

[54] TRANSMISSION INPUT BEARING RETAINER

[75] Inventors: Kevin M. Allen, Bartlesville, Okla.; Kenneth T. Picone, Pinehurst; Peggy M. Garrett, Laurinburg, both of N.C.

[73] Assignee: Meritor Heavy Vehicle Systems, LLC, Troy, Mich.

[21] Appl. No.: 08/905,029

[22] Filed: Aug. 1, 1997

[51] Int. Cl.$^6$ ................................................. F16H 57/02
[52] U.S. Cl. ................. 192/110 B; 182/112; 74/606 R; 384/537; 384/510
[58] Field of Search .............................. 192/110 B, 112; 384/474, 510, 585, 537, 903; 74/606 R, 467

[56] References Cited

U.S. PATENT DOCUMENTS

| | | |
|---|---|---|
| 2,018,488 | 10/1935 | Cotterman ..................... 74/606 R X |
| 2,230,604 | 2/1941 | Ware ............................... 74/606 R X |
| 4,112,786 | 9/1978 | Thomas ........................... 74/606 R X |
| 4,793,213 | 12/1988 | Nishimura ....................... 74/606 R X |
| 5,737,978 | 4/1998 | Stine .................................. 74/606 R |

Primary Examiner—Charles A. Marmor
Assistant Examiner—Ankur Parekh

[57] ABSTRACT

An input shaft bearing retainer for use in a vehicle transmission assembly maintains an input bearing in a desired position without the use of external fasteners such as bolts. The bearing retainer includes an exterior portion having a radially extending flange that is engaged between a transmission case outer wall and a clutch housing outer wall. Since the clutch housing outer wall remains fixed relative to the outer wall of the transmission case, the input bearing retainer is also maintained in place. The interface between an opening through the transmission case and the bearing retainer includes a seal member in the form of an O-ring to maintain a fluid tight seal at the opening of the transmission case.

16 Claims, 1 Drawing Sheet

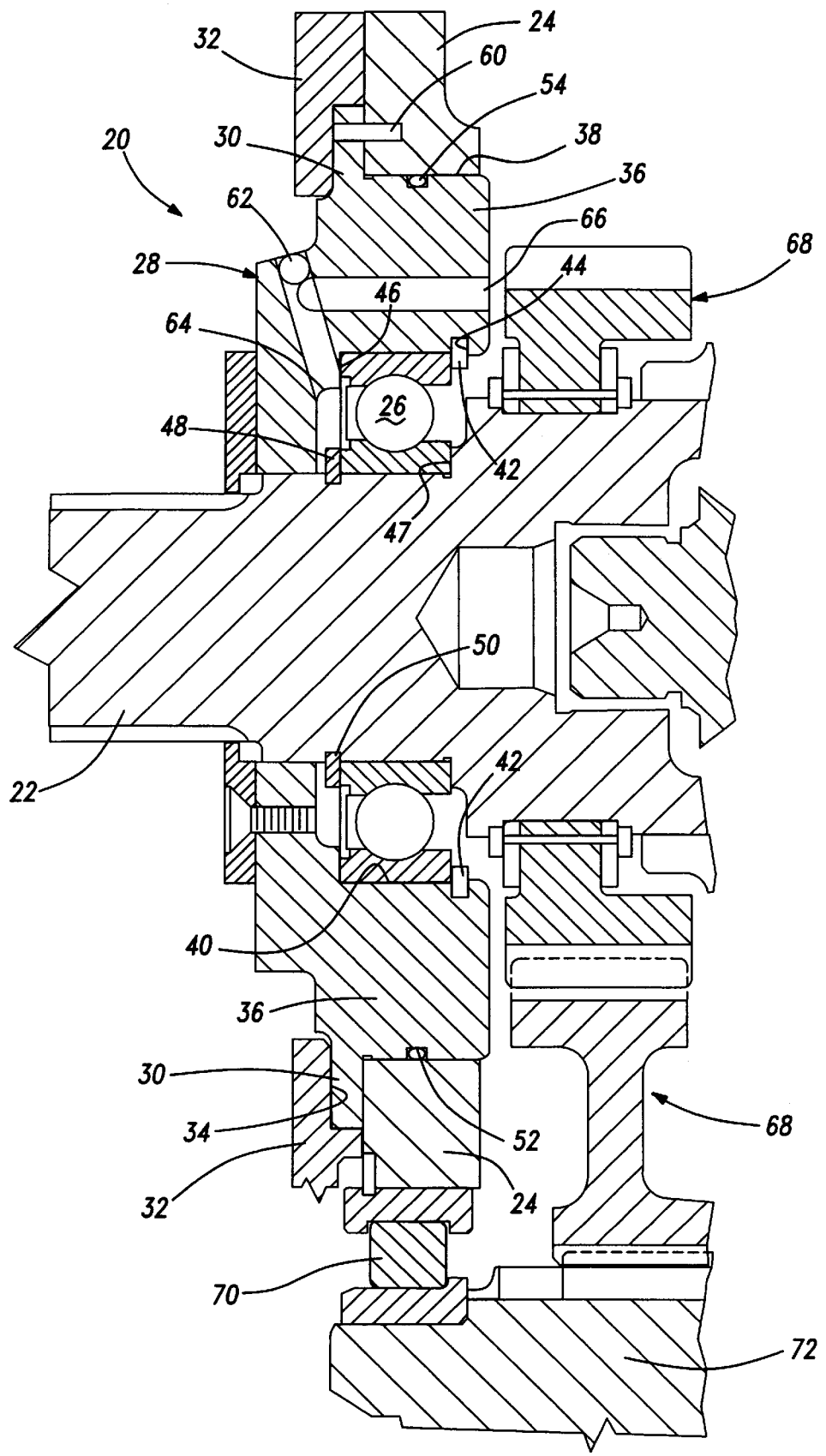

5,988,341

TRANSMISSION INPUT BEARING RETAINER

BACKGROUND OF THE INVENTION

This invention generally relates to a retainer for maintaining a bearing in a desired position on an input shaft for a vehicle transmission.

Vehicle transmissions are well known. Vehicle transmissions typically include an input shaft that is adapted to be coupled to an engine output shaft through a master clutch. When the engine output shaft is coupled with the transmission input shaft, the engine provides a motive force for rotating the transmission input shaft. The transmission input shaft rotates through a gearing arrangement to provide a drive force on a transmission output shaft that operates to drive the wheels of the vehicle.

The transmission input shaft rotates relative to other portions of the transmission, including a transmission case. Accordingly, bearings are provided to facilitate the rotation of the input shaft. The conventional manner of arranging bearings on an input shaft introduces several drawbacks and difficulties. Conventionally, input shaft bearings have typically been held in place using an assembly that includes a plurality of bolts or other fasteners to hold the input bearings in place. These bolts and fasteners render the overall assembly more time-consuming for assembly and disassembly when it is desirable to service or repair the transmission. In addition to rendering a transmission more difficult to service, the conventional manner of maintaining input shaft bearings in a desired position has placed physical limitations on remaining portions of the transmission that are less than optimum. For example, bearings associated with a countershaft in the transmission are necessarily restricted to certain dimensions because of the bolts or fasteners utilized to maintain the input shaft bearing in place.

Therefore, it is desirable to provide an improved transmission assembly where the input shaft bearing is maintained in place and that avoids the shortcomings and drawbacks discussed above. This invention addresses those needs.

SUMMARY OF THE INVENTION

In general terms, this invention is a transmission assembly having a bearing retainer that holds an input shaft bearing in place without using any external bolts or fasteners. The input bearing retainer of this invention is maintained in place between the transmission case outer wall and an outer wall on the clutch housing associated with the master clutch. This arrangement eliminates the need for additional or external bolts and fasteners. A single stop member is included to prevent the bearing retainer from rotating relative to the transmission case.

The transmission case has an outer wall with an opening. The input shaft has a first end that is received within the transmission case and a second end that protrudes out of the opening in the case. The input shaft is rotatable relative to the case so a bearing is included that generally surrounds a portion of the input shaft in the vicinity of the opening through the transmission case. The bearing retainer is received about the bearing and at least partially within the opening. The clutch housing has an outer wall that is maintained adjacent the transmission case outer wall so that the clutch housing engages a portion of the bearing retainer and thereby maintains the bearing retainer within the opening in the transmission case.

In the preferred embodiment, the bearing retainer includes an outwardly extending flange that is engaged within a counterbore on the outer wall of the clutch housing. The various features and advantages of this invention will become more apparent to those skilled in the art from the following detailed description of the presently preferred embodiment. The drawing that accompanies the detailed description can be described as follows.

BRIEF DESCRIPTION OF THE DRAWING

The FIGURE diagrammatically illustrates selected portions of a transmission assembly in partial cross-sectional view.

DETAILED DESCRIPTION OF THE PREFERRED EMBODIMENT

The FIGURE illustrates selected portions of a transmission assembly 20. An input shaft 22 is received partially within a transmission case 24. The transmission case 24 has an outer wall that is only partially shown in the FIGURE. The input shaft 22 includes one end that is received within the transmission case 24 and another end that protrudes out of the opening through the outer wall of the transmission case 24. The end that protrudes out of the transmission case is adapted to be engaged to an output shaft on an engine (not illustrated) through the use of a conventional master clutch. When the input shaft 22 is appropriately engaged with a rotating output shaft on an engine, the input shaft 22 rotates relative to the transmission case 24.

A bearing 26 facilitates rotation of the input shaft 22 relative to the transmission case 24. An input bearing retainer 28 maintains the bearing 26 in the desired position about the input shaft 22.

The bearing retainer 28 includes an inner portion that is generally received within the opening of the transmission case 24 and an outer portion that generally extends outward from the opening in the transmission case 24. The outer portion of the bearing retainer 28 includes an extension 30, which most preferably is in the form of a radially outwardly extending flange. The extension 30 is engaged by a portion of a clutch housing 32, which is associated with the master clutch (not illustrated). The clutch housing 32 is maintained adjacent the outer wall of the transmission case 24 in a conventional manner. Most preferably, a counterbore 34 nesting receives at least a portion of the extension 30 so that the extension 30 is maintained in axial alignment with the opening through the transmission case 24 as illustrated.

This represents a significant departure from prior designs. In conventional systems, a series of fasteners such as bolts were used to maintain the bearing 26 in proper position. A transmission assembly designed according to this invention eliminates the need for such fasteners. Since the clutch housing 32 is maintained in an adjacent position to the outer wall of the transmission case 24, no additional hardware is necessary to maintain the bearing retainer 28 in proper position. This renders the transmission assembly 20 much more readily serviceable and more economical to manufacture.

The inner portion of the bearing retainer 28 includes a body portion 36 having an outer periphery 38 and an inner periphery 40. The inner periphery 40 defines a bearing receiving chamber that receives the bearing 26 as illustrated. A stop member 42 is provided near the opening of the bearing receiving chamber to maintain the bearing 26 in axial alignment within the chamber. In the preferred embodiment, a generally annular groove 44 is provided along the inner periphery 40 of the body portion 36 and a snap ring 42 is received within the groove 44. The snap ring 42 acts as the stop member. Opposite the snap ring 42 is a radially inwardly extending wall 46. The bearing 26 is axially aligned between the snap ring 42 and the wall 46. The bearing 26 is further maintained in position between a surface 47 on the input shaft 22 and a snap ring 48 that is received within a groove 50 on the input shaft 22.

The outer periphery 38 of the inner body portion 36 is adapted to be received directly adjacent the opening in the transmission case outer wall 24. A seal member 52, which is most preferably an O-ring that is received within a groove 54 on the outer periphery 38. The seal member 52 maintains a fluid tight seal along the interface between the outer periphery 38 and the inner surface of the transmission case wall 24.

The bearing retainer 28 is maintained in a rotationally fixed position relative to the transmission case 24 through a stop member 60. In the preferred embodiment, the stop member 60 comprises a pin that is received through a counterbore in a portion of the transmission case 24 and into a bore through a portion of the retainer 28.

A fluid channel is defined between an opening 62 that communicates with an exterior of the retainer 28. A second opening 64 is in communication with that portion of the transmission assembly 20 that is directly adjacent the input shaft bearing 26. A third opening 66 is in communication with the interior of the transmission case 24 so that lubricant fluid can be supplied to the transmission gearing arrangement, which is partially illustrated at 68. The interconnection between the openings 62, 64 and 66 allows for lubricant fluid communication as may be desired or needed.

The inventive arrangement provides several advantages. The assembly, manufacture and servicing of a transmission designed according to this invention is much more economical than that achievable with prior art designs. The design and manufacture of the input bearing 26 is simplified and more economical. Further, the input shaft bearing 26 is capable of being designed to be larger and to provide better wear characteristics. Further, a countershaft bearing 70 associated with a countershaft 70 (only partially, schematically shown in the drawing) can be designed to be larger than previously achieved, which also provides improved wear characteristics.

The foregoing description is exemplary rather than limiting in nature. Variations and modifications to the disclosed embodiment may become apparent to those skilled in the art that do not necessarily depart from the purview and spirit of this invention. Accordingly, the legal scope of protection given to this invention can only be determined by studying the following claims.

We claim:

1. A vehicle transmission assembly, comprising:
    a transmission case having an outer wall with an opening through said outer wall;
    an input shaft having a first end received within said transmission case and a second end that protrudes out of said opening, said input shaft being rotatable relative to said transmission case;
    a bearing generally surrounding a portion of said input shaft in the vicinity of said opening, said bearing facilitating rotation of said shaft relative to said transmission case;
    a bearing retainer received about said bearing and partially within said opening, said bearing retainer including an extension that extends beyond said opening, said extension having a first axial face engaging said transmission case outer wall and a second, oppositely facing axial face; and
    a clutch housing having an outer wall adjacent said transmission case outer wall and engaging said bearing retainer second axial face to thereby maintain said bearing retainer within said opening.

2. The assembly of claim 1, wherein said extension is a radially outwardly extending flange.

3. The assembly of claim 1, wherein said inner portion includes a body portion having a bearing receiving chamber surrounding said bearing such that said bearing is received within an inner periphery of said chamber.

4. The assembly of claim 3, further comprising an axial retainer member that operates to maintain said bearing in a selected axial position within said chamber.

5. The assembly of claim 4, wherein said chamber inner periphery includes a notch and wherein said axial retainer member comprises a snap ring received in said notch.

6. The assembly of claim 5, wherein said chamber inner periphery includes a wall and a radial extension extending radially inward from said wall and wherein said bearing is received between said axial retainer member and said radial extension.

7. The assembly of claim 6, further comprising a notch on an outer periphery of said input shaft and a second snap ring received in said input shaft notch and wherein said bearing is received between said snap rings to thereby maintain said bearing in axial alignment with said input shaft and said retainer.

8. The assembly of claim 3, wherein said body portion includes an outer periphery that is received adjacent said transmission case opening and further including a seal member that seals an interface between said opening and said body portion outer periphery.

9. The assembly of claim 8, wherein said seal member comprises an O-ring and wherein said outer periphery includes a groove that receives said O-ring.

10. The assembly of claim 1, wherein said bearing retainer includes a channel extending between a first opening through said outer portion and a second opening through said inner portion, said channel being adapted to selectively communicate lubricant through said channel and into an interior of said transmission case.

11. The assembly of claim 1, further comprising a stop member cooperating with said bearing retainer and said transmission case to prevent rotational movement between said case and said retainer.

12. The assembly of claim 1, wherein said bearing retainer includes an outer flange portion that has an exterior dimension that is greater than said transmission case opening and wherein said clutch housing includes an inner dimension that is less than said flange exterior dimension such that said flange is maintained between a portion of said transmission case outer wall that is adjacent said opening and a portion of said clutch housing adjacent said interior dimension.

13. The assembly of claim 12, wherein said bearing retainer includes an inner body portion having an outer periphery that is received adjacent said opening and further including a seal member sealing an interface between said retainer member outer periphery and said opening.

14. The assembly of claim 13, wherein said bearing retainer outer periphery includes a groove and said seal member comprises an O-ring received in said groove.

15. A vehicle transmission assembly, comprising:
    a transmission case having an outer wall with an opening through said outer wall;
    an input shaft having a first end received within said transmission case and a second end that protrudes out of said opening, said input shaft being rotatable relative to said transmission case;
    a bearing generally surrounding a portion of said input shaft in the vicinity of said opening, said bearing facilitating rotation of said shaft relative to said transmission case;

a bearing retainer received about said bearing and partially within said opening, said bearing retainer including an outer flange portion that has an exterior dimension that is greater than said transmission case opening; and a clutch housing having an outer wall adjacent said transmission case outer wall, said clutch housing including an inner dimension that is less than said flange exterior dimension such that said clutch housing engages said flange portion and said flange is maintained between a portion of said transmission case outer wall that is adjacent said opening and a portion of said clutch housing adjacent said interior dimension.

16. A bearing retainer for use in a vehicle transmission to maintain a bearing in a selected position relative to an input shaft of the transmission that is received through an opening in a transmission case wall, comprising:

an inner body portion having an inner periphery defining a bearing receiving chamber and an outer periphery that is adapted to be received adjacent the opening in the transmission case wall;

an outer portion including a flange having an outer dimension such that said flange is adapted to be engaged by the transmission case wall and a clutch housing whereby said bearing retainer is maintained in a selected position; and a fluid passage through said inner body portion and said outer portion having a first opening in communication with an exterior of said outer portion, a second opening in communication with said bearing receiving chamber and a third opening through said inner body portion between said inner periphery and said outer periphery.

* * * * *